United States Patent
Chung et al.

(10) Patent No.: US 11,093,873 B2
(45) Date of Patent: Aug. 17, 2021

(54) USING A PRODUCTIVITY INDEX AND COLLABORATION INDEX FOR VALIDATION OF RECOMMENDATION MODELS IN FEDERATED COLLABORATION SYSTEMS

(71) Applicant: Atlassian Pty Ltd, Sydney (AU)

(72) Inventors: Sukho Chung, Mountain View, CA (US); Jennifer Prendki, Mountain View, CA (US)

(73) Assignee: ATLASSIAN PTY LTD., Sydney (AU)

( * ) Notice: Subject to any disclaimer, the term of this patent is extended or adjusted under 35 U.S.C. 154(b) by 0 days.

(21) Appl. No.: 16/282,271

(22) Filed: Feb. 21, 2019

(65) Prior Publication Data
US 2019/0303838 A1    Oct. 3, 2019

Related U.S. Application Data

(60) Provisional application No. 62/650,483, filed on Mar. 30, 2018.

(51) Int. Cl.
*G06Q 10/06* (2012.01)
*G06F 16/28* (2019.01)
(Continued)

(52) U.S. Cl.
CPC ... *G06Q 10/063116* (2013.01); *G06F 16/256* (2019.01); *G06F 16/288* (2019.01);
(Continued)

(58) Field of Classification Search
None
See application file for complete search history.

(56) References Cited

U.S. PATENT DOCUMENTS

| 7,483,842 B1 * | 1/2009 | Fung | G06Q 30/02 705/7.14 |
| 9,858,579 B1 * | 1/2018 | Coleman | G06Q 30/0283 |

(Continued)

FOREIGN PATENT DOCUMENTS

| WO | WO-2012076755 A1 * | 6/2012 | G06Q 30/0631 |

OTHER PUBLICATIONS

Yu, J., Reddy, Y., Sentil Selliah, Vijayanand Bharadwaj, Sumitra Reddy, Srinivas Kankanahalli. (2005). A workflow-centric, context-aware collaboration framework. Proceedings of the Ninth International Conference on Computer Supported Cooperative Work in Design, 2005. doi:10.1109/cscwd.2005.194225 (Year: 2005).*

*Primary Examiner* — Matthew S Gart
*Assistant Examiner* — Tiera J Fletcher
(74) *Attorney, Agent, or Firm* — Brownstein Hyatt Farber Schreck, LLP (57) ABSTRACT

A computer-implemented method comprises, generating, for each group of a plurality of groups of user accounts, a collaboration index value representing a first level of interaction of the each group with other groups of the plurality of groups, the interaction comprising a plurality of operations using a plurality of different computer-implemented applications or functions, generating, for each group of the plurality of groups, a productivity index value, each productivity index value representing a second level of productivity of the respective group, the productivity comprising creating or editing electronic documents using the plurality of different computer-implemented applications or functions, storing, in one or more data repositories, a plurality of first recommendation segments for a collaboration index, each of the first recommendation segments for the collaboration index indicating a range of collaboration index values, storing, in one or more data repositories, a plurality of second recommendation segments for a productivity index, (Continued)

each of the second recommendation segments for the productivity index indicating a range of productivity index values, assigning a first recommendation to each first recommendation segment for the collaboration index and to each second recommendation segment for the productivity index, determining a second recommendation for each group of the plurality of groups based at least on: the collaboration index value of the respective group, the productivity index value of the respective group, the plurality of first recommendation segments for the collaboration index, and the plurality of second recommendation segments for the productivity index and generating and causing displaying, at a computer associated with each group of the plurality of groups, a digital data display that indicates the second recommendation for the respective group.

20 Claims, 5 Drawing Sheets

(51) Int. Cl.
*G06F 16/908* (2019.01)
*G06F 16/9035* (2019.01)
*G06F 16/25* (2019.01)
*G06F 16/901* (2019.01)

(52) U.S. Cl.
CPC ........ *G06F 16/908* (2019.01); *G06F 16/9024* (2019.01); *G06F 16/9035* (2019.01); *G06Q 10/063114* (2013.01)

(56) References Cited

U.S. PATENT DOCUMENTS

| | | | |
|---|---|---|---|
| 2012/0246267 A1* | 9/2012 | Mallet | G06F 15/17306 709/217 |
| 2015/0199630 A1* | 7/2015 | Pfeiffer | G06Q 10/0639 707/722 |
| 2016/0260046 A1* | 9/2016 | Cai | G16H 70/20 |
| 2016/0274558 A1* | 9/2016 | Strohmenger | G05B 19/0428 |
| 2017/0279836 A1* | 9/2017 | Vasseur | G06N 20/00 |
| 2018/0124129 A1* | 5/2018 | Geisler | H04L 67/306 |
| 2018/0157692 A1* | 6/2018 | Hisano | G06F 17/18 |
| 2018/0159889 A1* | 6/2018 | Sjouwerman | G06N 5/02 |
| 2018/0174204 A1* | 6/2018 | Assem Aly Salama | G06Q 30/0282 |
| 2019/0012167 A1* | 1/2019 | Boss | G06N 20/00 |

* cited by examiner

USING A PRODUCTIVITY INDEX AND COLLABORATION INDEX FOR VALIDATION OF RECOMMENDATION MODELS IN FEDERATED COLLABORATION SYSTEMS

BENEFIT CLAIM

This application claims the benefit under 35 U.S.C. § 119(e) of provisional application 62/650,483, filed Mar. 30, 2018, the entire contents of which are hereby incorporated by reference for all purposes as if fully set forth herein.

TECHNICAL FIELD

The present disclosure generally relates to improved systems, methods, computer software and hardware in the field of enterprise productivity applications. The disclosure relates more specifically to improved computer-implemented systems and methods for validating recommendation models and generating more efficient recommendations.

BACKGROUND

The approaches described in this background section are not necessarily prior art to the claims in this application and are not admitted as prior art by inclusion in this section.

Computer-implemented business communication collaboration systems are now available that integrate functions such as chat rooms, document storage and document sharing. These systems can be deployed independently or as part of a federated system that includes collaborative document editing, media sharing, code editing and issue tracking systems. A commercially available example is the STRIDE messaging system, available from Atlassian Pty Ltd., Sydney, Australia, alone or in conjunction with the CONFLUENCE document management system, BITBUCKET program source code repository and/or JIRA issue tracking system.

Effective use of these systems can be increased by use of recommendations functions. An example is a programmatic extension to any of the foregoing systems that determines recommended content for a particular user account, then generates and transmits notification messages to user accounts with recommendations of documents to view, work tasks to perform or issues to review.

Recommendations may be based on historical activity and what work is available to do. Recommendations typically are driven by a computer-implemented decision model, which may have a neural network, classifier, decision tree or other machine learning software as a foundation. A particular problem to be solved in the present invention is the inaccuracy and inefficacy of providing recommendations to individuals and groups of users in a federated system environment.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections according to the following outline:
1. Overview
2. Example System Implementation
3. Example Functional Implementation
4. Technical Benefits
5. Implementation Example—Hardware Overview
6. Extensions and Alternatives

1. Overview

Computer-implemented techniques are provided for using a productivity and collaboration index for validation of recommendation models in federated systems.

A collaboration index value represents a level of interaction between individual users or groups of users. A productivity index value represents a level of productivity of an individual user or group of users. Productivity comprises creating or editing electronic documents as defined herein.

The process of generating productivity and collaboration index values begins by receiving digital action signals from one or more applications. Digital action signals may include any action that is performed or executed by a user on the one or more applications. Examples include sending a chat message, liking a post, creating an issue ticket. The applications may be applications that exist as part of a federated system, such as CONFLUENCE, STRIDE, JIRA, and/or BITBUCKET. When the digital action signals are received, it is determined which entity or application that the digital action signal relates to and are stored as a digital record in a table for the corresponding entity. For example, all digital action signals that are determined to be received from JIRA are stored in a table with other received digital action signals.

Once the digital signals are sorted into entity tables and stored as digital records, a user interaction table is generated that stores digital records from the entity tables that correspond to collaboration operations. For example, the user interaction table stores digital records that include interactions between individual users or groups of users such as a user sending a chat message to another user or a user mentioning another user in a post or document. A user action table is also generated that stores digital records from the entity tables that specify which actions in entities were performed by individual users. For example, the user action table stores digital records that correspond to user actions are executed in any of the applications such as the creation of an issue ticket or creating a page. Based on the user interaction table and the user action table, a social graph may be generated that represents all actions and interactions between users.

Once the user action table, user interaction table, and social graph are generated digital metadata that indicates counts of different productivity and collaboration features. For example, digital metadata for productivity features may indicate, for each user, number of actions across applications and/or number of actions in different applications. Digital metadata for collaboration features may indicate, for each user, number of interactions across products, number of unique containers the interactions occurred on.

The calculated features may then be combined into a single dataset and various data transformation techniques including normalization of values may be performed on the data to prepare it for input to a PCA model. Once prepared, the PCA model produces a single score ranging from 0 to 1 with weightings of individual features that led to the score. For example, a PCA module may produce a collaboration index score of 0.88 with weights distributed among features such as: '0.90*num_interactions_conf+0.44*num_unique_actionsubjects+0.06*num_mentions'.

Once the productivity and collaboration index values are generated recommendation segments for a productivity and collaboration index are generated and stored. A recommendation segment indicates a range of values for either a productivity index or collaboration index. For example, a recommendation segment for a productivity index may indicate of a range of values from [0-0.5]. Once the recommendation segments are prepared, various recommendations may be assigned to each segment. For example, for a recommendation segment for a productivity index indicating a range of values from [0-0.5], a recommendation may be assigned that recommends particular tasks for a user to complete or other users that the user should collaborate with in order to increase productivity. Once the recommendations are assigned, they may be delivered to an individual user or a group of user via digital display.

In one embodiment, a computer implemented method comprises generating, for each group of a plurality of groups of user accounts, a collaboration index value representing a first level of interaction of the each group with other groups of the plurality of groups, the interaction comprising a plurality of operations using a plurality of different computer-implemented applications or functions, generating, for each group of the plurality of groups, a productivity index value, each productivity index value representing a second level of productivity of the respective group, the productivity comprising creating or editing electronic documents using the plurality of different computer-implemented applications or functions, storing, in one or more data repositories, a plurality of first recommendation segments for a collaboration index, each of the first recommendation segments for the collaboration index indicating a range of collaboration index values, storing, in one or more data repositories, a plurality of second recommendation segments for a productivity index, each of the second recommendation segments for the productivity index indicating a range of productivity index values, assigning a first recommendation to each first recommendation segment for the collaboration index and to each second recommendation segment for the productivity index, determining a second recommendation for each group of the plurality of groups based at least on: the collaboration index value of the respective group, the productivity index value of the respective group, the plurality of first recommendation segments for the collaboration index, and the plurality of second recommendation segments for the productivity index and generating and causing displaying, at a computer associated with each group of the plurality of groups, a digital data display that indicates the second recommendation for the respective group.

Other aspects, features and embodiments will become apparent from the disclosure as a whole. The described embodiments provide significant improvements to providing effective recommendations to users or groups of users in federated systems. Due to the ability to accurately quantify productivity and collaboration, productivity and collaboration values may be utilized with techniques described herein to vastly improve workplace efficiency, production, and collaboration. These techniques offer, in addition to the improvements discussed above, reduced usage of network bandwidth, CPU cycles, storage, and/or memory because of the efficiency and efficacy of the algorithms that are disclosed.

2. Example Computer System Implementation

Figure 1:
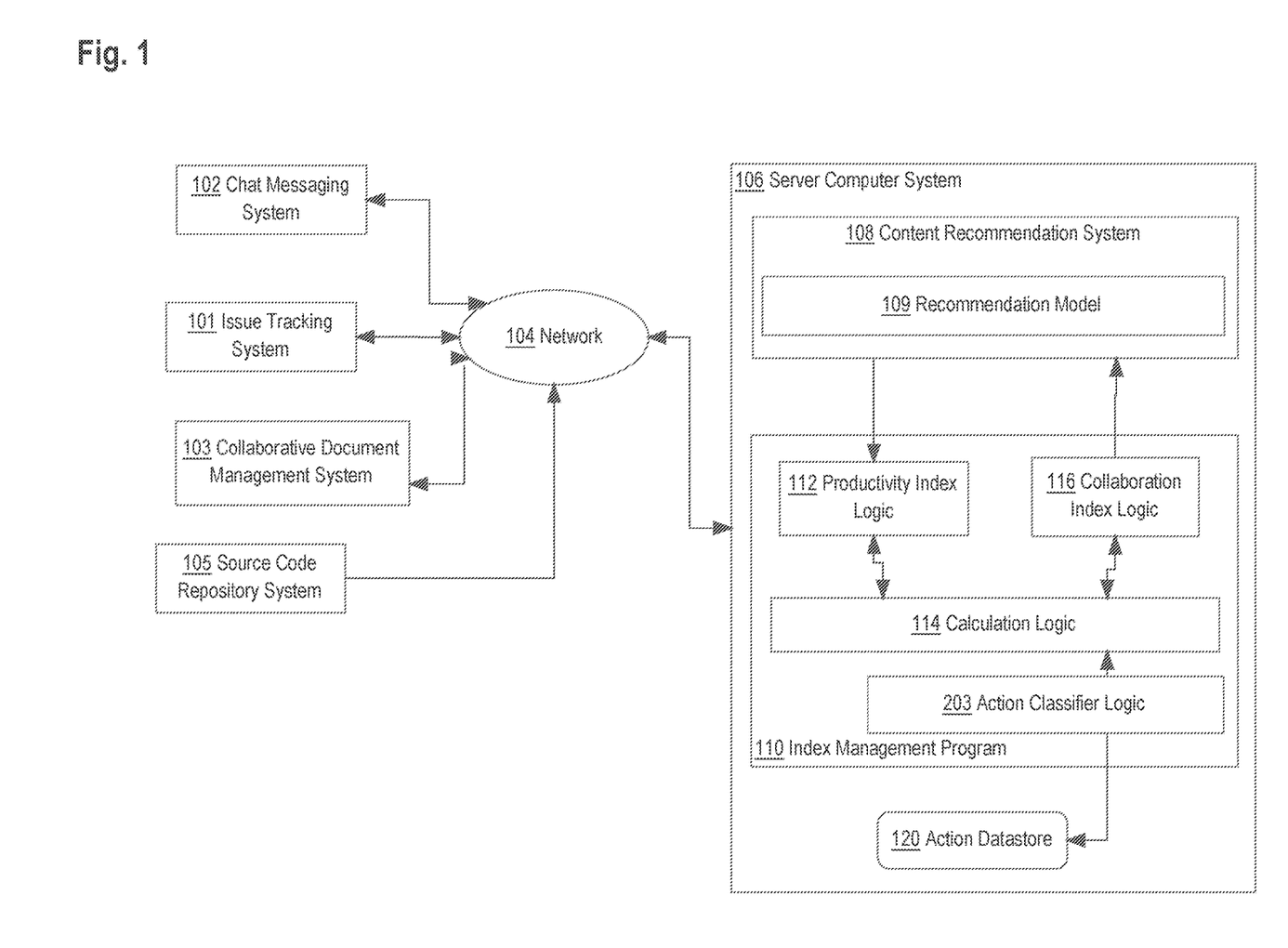
FIG. 1 illustrates a computer system in accordance with an embodiment of the invention.

FIG. 1 illustrates an example networked distributed computer system with which an embodiment may be implemented.

A plurality of computer program applications or systems 101, 102, 103, 105 are coupled via network 104 to a server computer system 106. In an embodiment, the applications comprise a chat messaging system 102, issue tracking system 101, collaborative document management system 103, and source code repository system 105, but other applications can be included and some of those shown in FIG. 1 can be omitted. Embodiments are optimized to blend signals from a plurality of different applications, indicating user interaction with content in those applications or with other user accounts.

The network 104 broadly represents any combination of one or more local area networks, wide area networks, campus networks and/or internetworks. Packet-switched networks may be used with networking infrastructure devices such as switches and routers that are programmed to communicate packet data based on internet protocol (IP), a transport protocol such as TCP or UDP, and higher-order protocols at any of several different logical layers, such as those defined by the Open Systems Interconnect (OSI) multi-layer internetworking model.

Server computer system 106 may comprise one or more cores, processors, computers, and/or virtual machine instances hosted on the premises of an enterprise or using a public or private cloud computing facility. In an embodiment, server computer system 106 hosts or executes a content recommendation system 108 that is supported by recommendation model 109 and programmed to provide recommendations of content to user accounts that are interacting with applications or systems 101, 102, 103, 105.

Server computer system 106 further executes or hosts an index management program 110 comprising, in one embodiment, productivity index logic 112, collaboration index logic 116, calculation logic 114 and action classifier logic 203. In an embodiment, the productivity index logic 112 is programmed or configured to calculate productivity index values for individual user accounts associated with applications or systems 101, 102, 103, 105 in the manner further described herein. In an embodiment, collaboration index logic 116 is programmed or configured to calculate collaboration index values for individual user accounts associated with applications or systems 101, 102, 103, 105 in the manner further described herein. The calculation logic 114 supports these functions and action classifier logic 203 is programmed or configured to classify action signals, such as mouse clicks or other indications of interaction with content or user accounts, from the applications or systems 101, 102, 103, 105 and to transform such signals into records in an action datastore 120.

Figure 2:
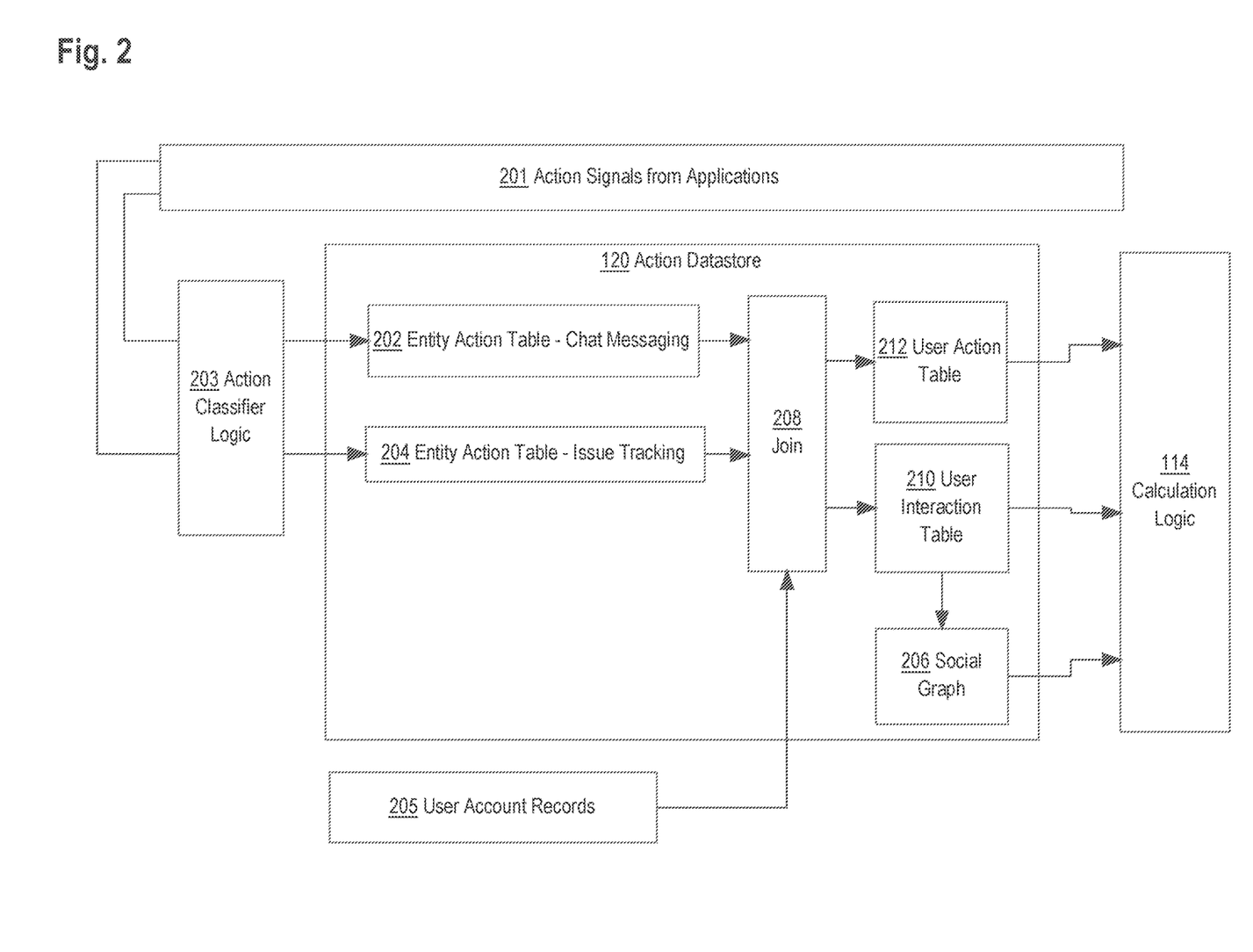
FIG. 2 illustrates an example database schema for the action datastore from FIG. 1, and support logic.

FIG. 2 illustrates an example database schema for the action datastore 120, and support logic. FIG. 2 will be described now in terms of both function and structure.

In an embodiment, a plurality of different action signals 210 from applications, such as the applications or systems 101, 102, 103, 105 of FIG. 1, are received at action classifier logic 203, which determines which entity a particular signal relates to and routes the signal to one of a plurality of entity action tables 202, 204. There may be any number of entity action tables 202, 204 and two are shown merely to illustrate one clear example. In an embodiment, one entity action table corresponds to each of the applications or systems 101, 102, 103, 105 that are known or installed in the system of FIG. 1. As an example, an action signal 201 indicates that a first user account wrote a chat message to a second user account, and the action classifier logic 203 would route that signal to the entity action table 202 for chat messaging.

In response, the corresponding entity action table 202, 204 creates and stores a record to represent the user account interaction with the corresponding entity. Thus, each of the entity action tables 202, 204 over time develops an entity-centric dataset, and each of the entity action tables over time represents all user actions that occurred with that entity. In one embodiment, data table rows in the entity action tables 202, 204 comprise are in the format: user A did Action on Entity.

In an embodiment, a join function 208 joins records from entity action tables 202, 204 with user account records 205, representing user accounts, users or end-user computers. The user account records 205 may be maintained in an external system. The join function 208 causes joining entity action records with user account records to result in joined records that specify which user accounts have undertaken collaboration operations. In an embodiment, collaboration records are created and stored in a user interaction table 210, which includes records with columns for pairs of user accounts that were involved in actions represented in the entity action tables and the specific content item or entity element through which they interacted. For example, if user accounts @Jon, @Julie both commented on a document titled "Management Report" in the CONFLUENCE system, then a record in user interaction table 210 would include column values for at least {@Jon, @Julie, CONFLUENCE, Management_Report}. In this example, CONFLUENCE is an entity node that identifies an entity through which the user accounts interacted. Each record in user interaction table 210 includes an entity node.

Furthermore, the join function 208 may result in creating and storing a user action table 212 that specifies which actions in entities were performed by individual user accounts. Continuing with the preceding example, the user action table 212 would include at least two (2) records having at least the columns: {@Jon, CONFLUENCE, Management_Report} and {@Julie, CONFLUENCE, Management_Report}.

Based on the foregoing derived tables 210, 212, a social graph 206 may be created and stored to represent user account interactions with more complexity. Rather than representing pairs of user accounts that interacted as in user interaction table 210, social graph 206 comprises stored digital data representing all interactions of all user accounts.

Based on these datasets, calculation logic 114 may be programmed or configured to extract or calculate counts or other metadata for actions that user accounts have taken in different applications, programs or systems. Examples of metrics that the calculation logic 114 can calculate include different productivity and collaboration features.

In an embodiment, a productivity index value that is calculated for a user account by the productivity index logic 112 reflects aspects of productivity of a particular user account. Productivity features may include: number of actions across products, number of actions in different applications, number of unique action subject via which the actions occurred, number of pages created, number of unique pages updated, number of attachments created, number of unique attachments updates, number of labels added to a page, number of issue tickets created, number of issue tickets updated, number of issue tickets resolved.

In an embodiment, a collaboration index value that is calculated for a user account by the collaboration index logic 116 reflects one or more social aspects of a user account. Collaboration features may include: number of interactions across products, number of unique containers the interactions occurred on, number of interactions in different applications, ratio and/or number of interactions between different applications, number of unique collaborators, number of unique actions subject via which the interactions occurred, number of comments created, number of comments updates, number of user mentions, average time between interactions.

In an embodiment, productivity index logic 112 and collaboration index logic 116 are programmed or configured to calculate indexes based upon intrateam and inter-team data, in environments in which user accounts are organized into teams. In an embodiment, user account records 206 may store team or group definitions. Team data, in combination with productivity index values and collaboration index values, may specify how well a user account is working within its team, and/or how the teams are working with other teams.

In an embodiment, the calculation logic 114 is programmed or configured to perform data transformation operations before generating productivity and collaboration index values. Data transformation operations may include the calculation logic 114 normalizing output data values. Normalizing data may include normalizing data by company size. For example, assume that an enterprise for which the present system is deployed has both a support team and a development team. These teams have different ways to measure their outputs; for example, the rate at which they create tickets in an issue tracking system will be different. The support team will have a high volume of creation of issues or tickets, while the development team will have a lower rate. Also, there may be variability based on the number of team members; for example, a 50-person team creates more tickets in an issue tracking system than a 5-person team. Thus, normalization logic can adjust for relative levels of activity of the group.

Normalizing data may also include utilizing rescaling techniques such as a logarithmic transformation, which can be used to handle heteroscedasticity. Min-max scaling techniques may also be used to ensure data is all scaled to the same level. Outlier removal techniques may also be performed on the data to remove behaviors that are anomalies.

Once the features are normalized, they are fed into a PCA model. In an embodiment, the signals that form a basis of score values are output to principal component analysis (PCA) software that is programmed to blend a plurality of features and cause a variable reduction to collapse to a single score. In an embodiment, the calculation logic 114 incorporates, calls or links to a PCA module and results in transforming a plurality of different metric values derived from the foregoing database tables into a single score ranging from 0 to 1 and weightings of individual features that led to the score. For example, a PCA module may produce a collaboration index score of 0.88 with weights distributed among features such as: '0.90*num_interactions_conf+ 0.44*num_unique_actionsubjects+0.06*num_mentions'.

In an embodiment, a third-party Python library such as sklearn.decomposition.PCA may be used to implement the PCA model and generate the scores and weights for each feature component of the score.

To verify the accuracy of the scores, element wise cross validation may be utilized. To implement cross validation, a PCA model, as discussed above, takes a matrix of data that represents features and their associated values and generates two different sets of matrices where the two separate matrices may be multiplied to result in the original matrix of data. The two sets of matrices represent original variables in principal components which are representative of the original variables. From the original matrix data, elements from matrix dataset are randomly removed and then PCA is run on the dataset. The PCA model generates the two sets of matrices which include the collaboration score, productivity score, and component features with associated weights. Given the scores, the PCA process is then reversed to regenerate a combined matrix of data, which may be slightly different than original matrix dataset. The randomly removed elements from the original matrix are compared to the corresponding elements from the regenerated matrix to determine error rate, e.g. how much information is being lost. This technique allows determining how well the PCA model is explaining the original variance of the features.

In an embodiment, the calculation logic 114 also is programmed or configured to execute post-model normalization to transform the output score to a new scale.

3. Example Functional Implementation

Figure 3:
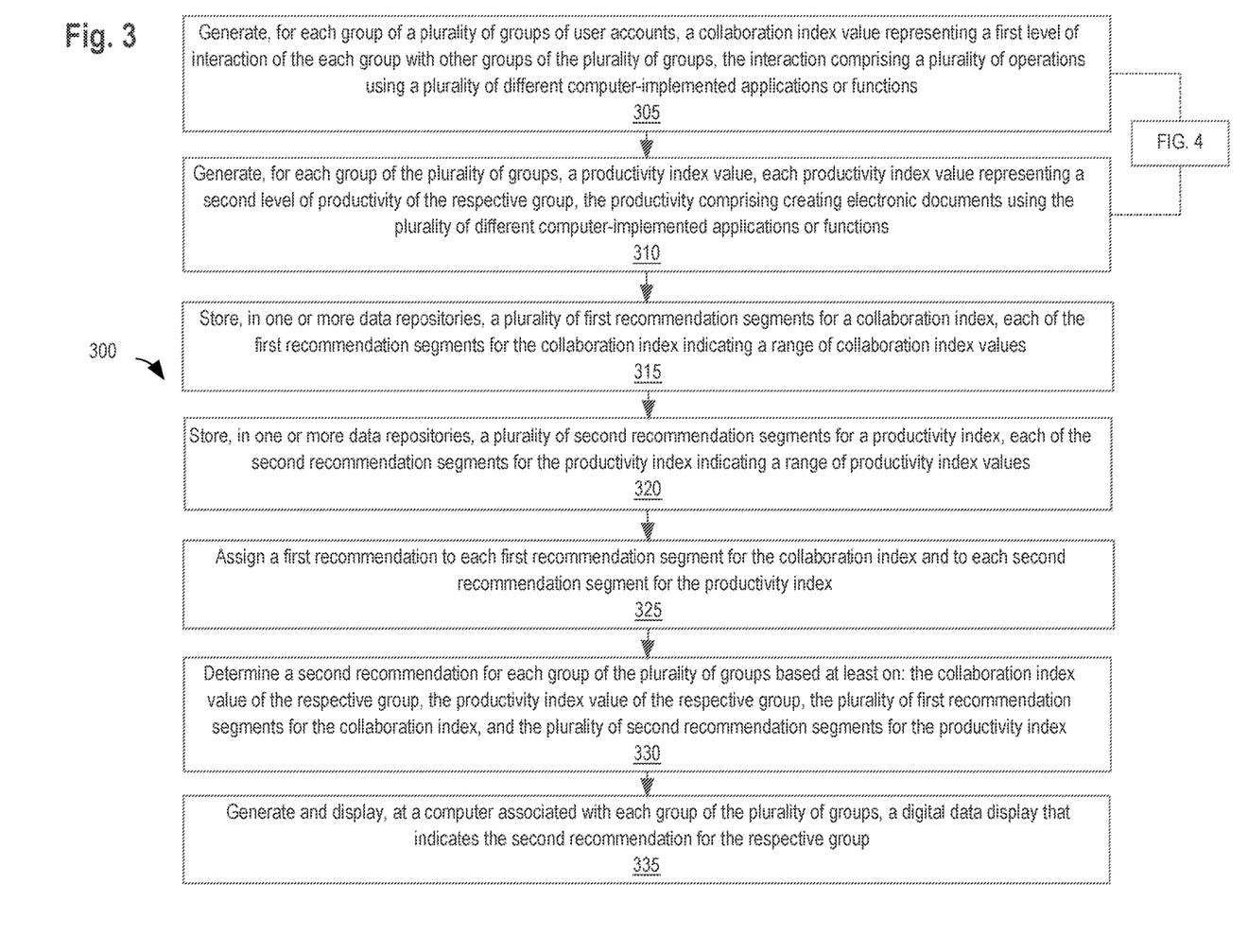
FIG. 3 illustrates an example flowchart of a method for validating recommendation models in federated collaboration systems.

FIG. 3 shows an example flowchart of a method for validating recommendation models in federated collaboration systems.

Although the steps in FIG. 3 are shown in an order, the steps of FIG. 3 may be performed in any order and are not limited to the order shown in FIG. 3. Additionally, some steps may be optional, may be performed multiple times, or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 305, for each group of a plurality of groups of user accounts, a collaboration index value representing a first level of interaction of each group with other groups of the plurality of groups is generated, the interaction comprising a plurality of operations using a plurality of different computer-implemented applications or functions. Interactions may include chat messages between individuals, creating comments, updating comments, mentioning of users in posts, tickets, and messages, likes on content, and any other social actions where one user is interacting with another. An example of generating a collaboration index value is illustrated in detail by flow 400 of FIG. 4, as discussed below.

In step 310, for each group of the plurality of groups, a productivity index value is generated, each productivity index value representing a second level of productivity of the respective group, the productivity comprising creating or editing electronic documents using the plurality of different computer-implemented applications or functions. 'Creating or editing electronic documents' may be defined as any productivity action that involves creating or editing an electronic document. An 'electronic document' is defined as any electronic media content that is intended to be used in electronic form. Creating or editing an electronic documents includes actions such as: creating pages, updating pages, creating attachments, updating attachments, creating and adding labels, creating issue tickets, updating issue tickets, resolving issue tickets. An example of generating a productivity index value is illustrated in detail by flow 400 of FIG. 4.

Figure 4:
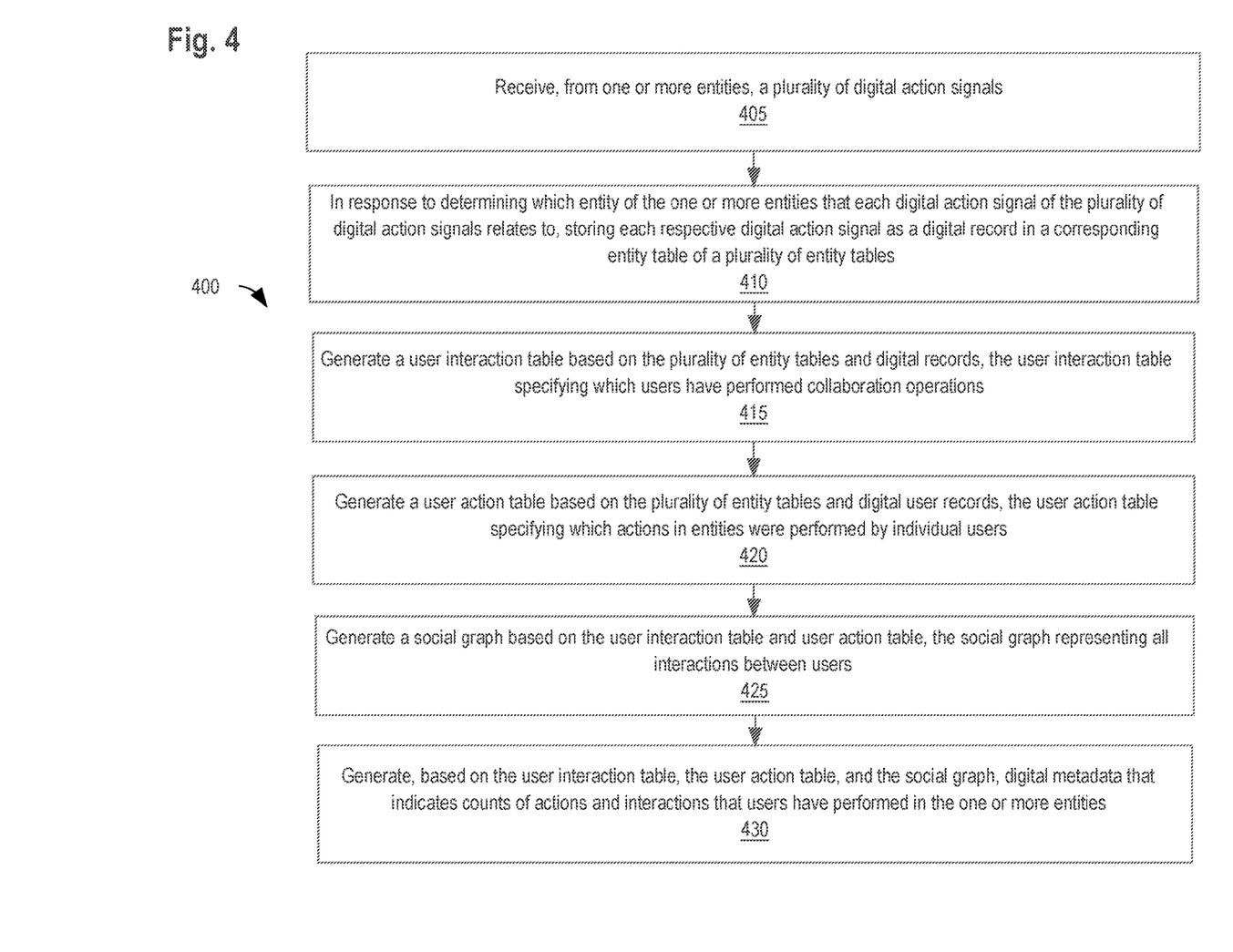
FIG. 4 illustrates an example flowchart of a method for generating collaboration index values and productivity index values.

FIG. 4 illustrates an example flowchart of a method for generating collaboration index values and productivity index values. Referring now to FIG. 4, in step 405, a plurality of digital action signals are received from one or more entities. For example, the server computer system 106 at action classifier logic 203 receives action signals from various applications, also referred to herein as entities, such as chat messaging system 102, issue tracking system 101, collaborative document management system 103, and source code repository system 105.

In step 410, in response to determining which entity of the one or more entities that each digital action signal of the plurality of digital action signals relates to, each respective digital action signal is stored as a digital record in a corresponding entity table of a plurality of entity tables. For example, action classifier logic 203 determines which entity a particular signal relates to and routes the signal to one of a plurality of entity action tables 202, 204. The corresponding entity action table 202, 204 creates and stores a record to represent the user account interaction with the corresponding entity. Each particular entity table may relate to a corresponding application, system, or entity. As an example, an action signal and/or digital record may indicate that a first user account wrote a chat message to a second user account, and the action classifier logic 203 would route that action signal to the entity action table 202 for chat messaging. In one embodiment, data table rows in the entity action tables 202, 204 are in the format: user A did Action on Entity.

In step 415, a user interaction table is generated based on the plurality of entity tables and digital records, the user interaction table specifying which users have performed collaboration operations. For example, a join function 208 joins records from entity action tables 202, 204 with user account records 205, representing user accounts, users or end-user computers. The user account records 205 may be maintained in an external system. The join function 208 causes joining entity action records with user account records to result in joined records that specify which user accounts have undertaken collaboration operations. In an embodiment, collaboration records are created and stored in a user interaction table 210 which includes records with columns for pairs of user accounts that were involved in actions represented in the entity action tables and the specific content item or entity element through which they interacted.

For example, if user accounts @Jon, @Julie both commented on a document titled "Management Report" in the CONFLUENCE system, then a record in user interaction table 210 would include column values for at least {@Jon, @Julie, CONFLUENCE, Management Report}. In this example, CONFLUENCE is an entity node that identifies an entity through which the user accounts interacted. Each record in user interaction table 210 includes an entity node.

In step 420, a user action table is generated based on the plurality of entity tables and digital user records, the user action table specifying which actions in entities were performed by individual users. For example, a join function 208 joins records from entity action tables 202, 204 with user account records 205, representing user accounts, users or end-user computers. The join function 208 causes joining entity action records with user account records to result in joined records that specify which user accounts have undertaken productivity and/or collaboration operations. The join function 208 may result in creating and storing a user action table 212 that specifies which actions in entities were performed by individual user accounts. Continuing with the preceding example from step 415, the user action table 212 would include at least two (2) records having at least the columns: {@Jon, CONFLUENCE, Management_Report} and {@Julie, CONFLUENCE, Management_Report}.

In step 425, a social graph is generated based on the user interaction table and user action table, the social graph representing all interactions between users. For example, server computer system 106 may generate and store a social graph 206 to represent user account interactions with more complexity. Rather than representing pairs of user accounts that interacted as in user interaction table 210 or singular action as in user action table 212, social graph 206 comprises stored digital data representing all interactions of all user accounts.

In step 430, digital metadata is generated based on the user interaction table, the user action table, and the social graph, that indicates counts of actions and interactions that users have performed in the one or more entities. For example, based on the foregoing derived tables 210, 212, and social graph 206, calculation logic 114 may be programmed or configured to extract or calculate counts or other metadata for actions that user accounts have taken in different applications, programs or systems. Examples include different productivity and collaboration features and corresponding values.

In an embodiment, productivity features may include: number of actions across products, number of actions in different applications, number of unique action subject via which the actions occurred, number of pages created, number of unique pages updated, number of attachments created, number of unique attachments updates, number of labels added to a page, number of issue tickets created, number of issue tickets updated, number of issue tickets resolved.

In an embodiment, collaboration features may include: number of interactions across products, number of unique containers the interactions occurred on, number of interactions in different applications, ratio and/or number of interactions between different applications, number of unique collaborators, number of unique actions subject via which the interactions occurred, number of comments created, number of comments updates, number of user mentions, average time between interactions. Specific examples Productivity and collaboration features and respective values for each feature may be combined into a single dataset. The dataset may be transformed using various data transformation operations, as discussed above. Once transformed, the dataset may be fed into a PCA model that is programmed to blend a plurality of features and cause a variable reduction to collapse to a single score. In an embodiment, the calculation logic 114 incorporates, calls or links to a PCA module and results in transforming a plurality of different metric values derived from the foregoing database tables into a single score ranging from 0 to 1 and weightings of individual features that led to the score. For example, a PCA module may produce a collaboration index score of 0.88 with weights distributed among features such as: '0.90*num_interactions_conf+0.44*num_unique_actionsubjects+0.06*num_mentions'. As another example, a PCA module may produce a productivity index score of 0.79 with weights distributed among features such as: '−0.68*num_unique_actionsubjects+−0.51*issues_created+−0.52*issues updated'.

To verify the accuracy of the scores, the dataset may be cross validated, as discussed above.

In some embodiments, recency, frequency and network effects may impact the calculation of productivity and collaboration index values. Recency and frequency metrics may be used as a basis of calculating the productivity index. Recency metrics may indicate that how recent each user action or user interaction associated with a digital record was performed. Frequency metrics may indicate how often each user action or user interaction associated with a digital record was performed. For example, interactions with content or other types of the action signals and/or features mentioned above may be given greater weight in calculating an index value when they are recent, and less recent interactions may be given less weight. Additionally, interactions with content or other types of the action signals and/or features mentioned above may be given greater weight in calculating an index value when they are more frequent. For example, a link of one user account to another user account in the social graph described above can be assigned a weight value that is greater when the interaction between the user accounts is frequent.

Network effects align with the collaboration index. Network effects describe a metric of how interactive a user account is with other users. There are varying orders at which a user can interact with other users. If two users interact by performing an action on the same digital record then it is a first-order interaction, and if another user interacts with one of the aforementioned users but not the other then it is a second-order interaction between the users who did not interact with each other.

For example, User A creates a page (Entity X) in CONFLUENCE and User B adds a comment (Entity Y) on that page. User A and User B have directly interacted with each other via Entity X, making their interaction a first-order. Furthermore, if User C replies to User B's comment (Entity Y), now User C and User B have established a first-order interaction. However, since User C and User A have never directly interacted but shared the same connective node (User B), User C and User A's interaction can be described as a second-order interaction.

Such relationships can be mapped in a network graph model where each user is represented by a node and each interaction is represented by an edge. By the method of graph traversal, one can determine who belongs to a particular user's network at varying degrees of separation (1st-order, 2nd-order, etc.). This is particularly helpful in determining not just how interactive or social a user is (represented by the size of his network) but also the strength of his or her interactions with the neighboring users (represented by the number or type of edges they share). The information extracted from this representation can be translated as features for the collaboration index.

In some embodiments, the resulting index values may be used for validation of recommendations and other applications. For example, the index values may be useful for direct evaluation of collaboration and productivity of teams and groups of users. Furthermore, in an embodiment, per-enterprise or per-customer tuning of score values could indicate that a particular recommendation model is more suitable or less suitable for generating recommendations for a particular enterprise or customer. As an example, assume that a first model was for content recommendation, but the index values calculated as described herein indicate that the recommended content did not receive a high level of interaction. In this example, engagement metrics do not tell the whole story; productivity still could be high even with low engagement on recommended content. Therefore, the index values could indicate that recommended content does not contribute to productivity, so the first model need to be tuned or a second model needs to be substituted.

Returning to FIG. 3, in step 315, a plurality of first recommendation segments for a collaboration index are stored in one or more data repositories, each of the first recommendation segments for the collaboration index indicating a range of collaboration index values. For example, server computer system 106 stores the plurality of first recommendation segments in a database. The database may be directly coupled to server computer system or may be accessed over the network 104. A recommendation segment for a collaboration index may indicate a range of collaboration index values. For example, for a collaboration index that has values ranging from [0-1], a recommendation segment may include a range of values from [0-0.5] while another recommendation segment may include a range of values from [0.5-1].

In step 320, a plurality of second recommendation segments for a productivity index are stored in one or more data repositories, each of the second recommendation segments for the productivity index indicating a range of productivity index values. For example, server computer system 106 stores the plurality of second recommendation segments in a database. The database may be directly coupled to server computer system or may be accessed over the network 104. A recommendation segment for a productivity index may indicate a range of productivity index values. For example, for a productivity index that has values ranging from [0-1], a recommendation segment may include a range of values from [0-0.5] while another recommendation segment may include a range of values from [0.5-1].

In step 325, a first recommendation is assigned to each first recommendation segment for the collaboration index and to each second recommendation segment for the productivity index. For example, server computer system 106 assigns and stores recommendations in association with recommendation segments in a database. The database may be directly coupled to server computer system or may be accessed over the network 104. Recommendations may be associated and stored with one or more recommendation segments.

In an embodiment, index values may be used to perform user account recommendation. In user account recommendation, the individual applications 101, 102, 103, 105 may be programmed to generate a recommended list of user accounts to mention. For example, for a particular second recommendation segment that indicates a range of productivity index values of [0-0.5], a recommendation may be assigned to the particular second recommendation segment that recommends for a user to join a particular group of users. The user may be recommended to the particular group of users that has a productivity index value between 0 and 0.5 based on identifying that by adding the user to the particular group of users, the productivity index value for the particular group will increase, which indicates that the group will be more productive. Thus, recommendations may be assigned to recommendation segments such that if a particular group were to follow and implement the action suggested by a particular recommendation for the particular group, the productivity and collaboration index values for the particular group would be improved and/or optimized.

In some embodiments, the issue tracking system 101 could be programmed to recommend user accounts to follow a new issue or ticket that has just been created, in response to detecting creation of a new ticket or issue. For example, a recommendation of user accounts could specify those user accounts with whom a particular user account most frequently works or has most recently worked with, as indicated by the collaboration index for that user account or the social graph. Thus, the collaboration index defined herein, and the social graph can support which users should be recommended in these applications, and can measure how the collaboration and/or productivity of the team will change based on the index values after a recommended user.

As another example of recommendation types, a collaborative document management system like CONFLUENCE has a collection of document templates or macros that are tailored for a specific exercise or task. These templates could be recommended to users and teams on the basis of their indices along with other attributes that describe them. For example, a team of users who belong to a particular department or service line but with a below average productivity index or collaboration index could learn from the ways an above average team works in the same department or service line. A ranked listed of templates or macros that are utilized by users who belong to segments of higher indices could be recommended to the user. Furthermore, by monitoring the indices of the teams to whom the recommendations were made insights could be gained on the performance of the recommendation system and the further tuning of the system.

Furthermore, chat messaging systems could largely benefit from recommendation models that suggest highly active chat rooms to join or highly active users to direct message based on topics of interest. By segmenting the users based on their collaboration index as well as topics of expertise (topic modeling can be performed on their past work to determine this), the information could be used to rank a set of chat rooms or users who not only intersect with a particular user on a topic of interest but are also highly collaborative. This allows users to further engage with active chat rooms or users which they may have not discovered by themselves otherwise. This type of recommendation could be made for both new users and existing users equally and does not suffer from cold start problems where a new user does not have enough history for the recommendation system to make intelligent suggestions.

In step 330, a second recommendation for each group of the plurality of groups is determined based at least on: the collaboration index value of the respective group, the productivity index value of the respective group, the plurality of first recommendation segments for the collaboration index, and the plurality of second recommendation segments for the productivity index. For example, server computer system 106 determines a second recommendation based on combining the respective productivity index value for each group from the 112 productivity index logic, the respective collaboration index value for each group from the 116 collaboration index logic, the plurality of first recommendation segments for the collaboration index, and the plurality of second recommendation segments for the productivity index. Server computer system 106 identifies which first and second recommendation segments that each group's collaboration index values and productivity index values match with. For example, if a particular group has a collaboration index value of 0.9 and a productivity index value of 0.4, the server computer system 106 matches the respective values with recommendation segments that indicate a range of values that include a 0.9 collaboration index value, e.g. [0.5-1], and a 0.4 productivity index value, e.g. [0-0.5]. When a match is found, recommendations assigned to the respective recommendation segments in step 325 are determined.

In an embodiment, the second recommendation may include the first recommendation assigned to the respective recommendation segment for the collaboration index and the first recommendation assigned to the respective recommendation segment for the productivity index.

In step 335, a digital data display that indicates the second recommendation for the respective group is generated and caused to be displayed at a computer associated with each group of the plurality of groups.

In an embodiment where the second recommendation includes the first recommendation assigned to the respective recommendation segment for the collaboration index and the first recommendation assigned to the respective recommendation segment for the productivity index, the server computer may display either the first recommendation assigned to the respective recommendation segment for the collaboration index, the first recommendation assigned to the respective recommendation segment for the productivity index, or both.

In an embodiment, the server computer may display the recommendation corresponding to the lower value between the productivity index value and collaborations index value for the respective group.

4. Technical Benefits

The approaches described herein provide the ability to quantify productivity and collaboration in individual and group settings. Productivity and collaboration values may be utilized with techniques described herein to vastly improve workplace efficiency, production, and collaboration.

Using the productivity index, groups of users may be optimized to achieve maximum productivity in certain practice areas by identifying non-group members that, when added to a specific group, would increase overall productivity of the specific group to optimum levels. Using the collaboration index, groups of users may be optimized to achieve maximum collaboration by identifying non-group members that, when added to a specific group, would increase overall collaboration of the specific group to optimum levels.

Additionally, the various types of recommendations produced and validated using the productivity and collaboration indexes provide an advancement. Not only do the indices help provide more accurate and usable recommendations, but the indices can be used to validate and improve recommendations as different actions and interactions take place over time as a result of the recommendations. In contrast, "traditional" recommendation systems and models do not provide and the ability to validate and improve over time.

It will be apparent that the techniques of this disclosure provide numerous benefits including reducing the use of computer CPU cycles, storage, memory and network bandwidth that otherwise would be consumed by groups and individuals operating at less than optimal efficiency. As one specific example, for a group seeking to improve productivity in a certain practice area, a hiring team would normally spend vast amounts of time and resources in attempt to identify the right candidate to meet team productivity and collaboration goals. A hiring team would spend computing resources manually researching and analyzing each candidate's productivity and collaboration history. Instead of this antiquated approach, the techniques of this disclosure make it possible to generate and recommend candidates that would quantifiably improve the productivity and collaboration if they were added to the group. All this can be achieved using the automated techniques described herein without the use of manually performing extensive research and analysis and using valuable computing and company resources.

Further, the above method may reduce the usage of computing power, memory, and/or bandwidth by consolidating data items and making certain group member recommendations and content item and actions easily available to participants. Further, the overall usability and functionality of the computing device and associated applications is also greatly increased.

5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

Figure 5:
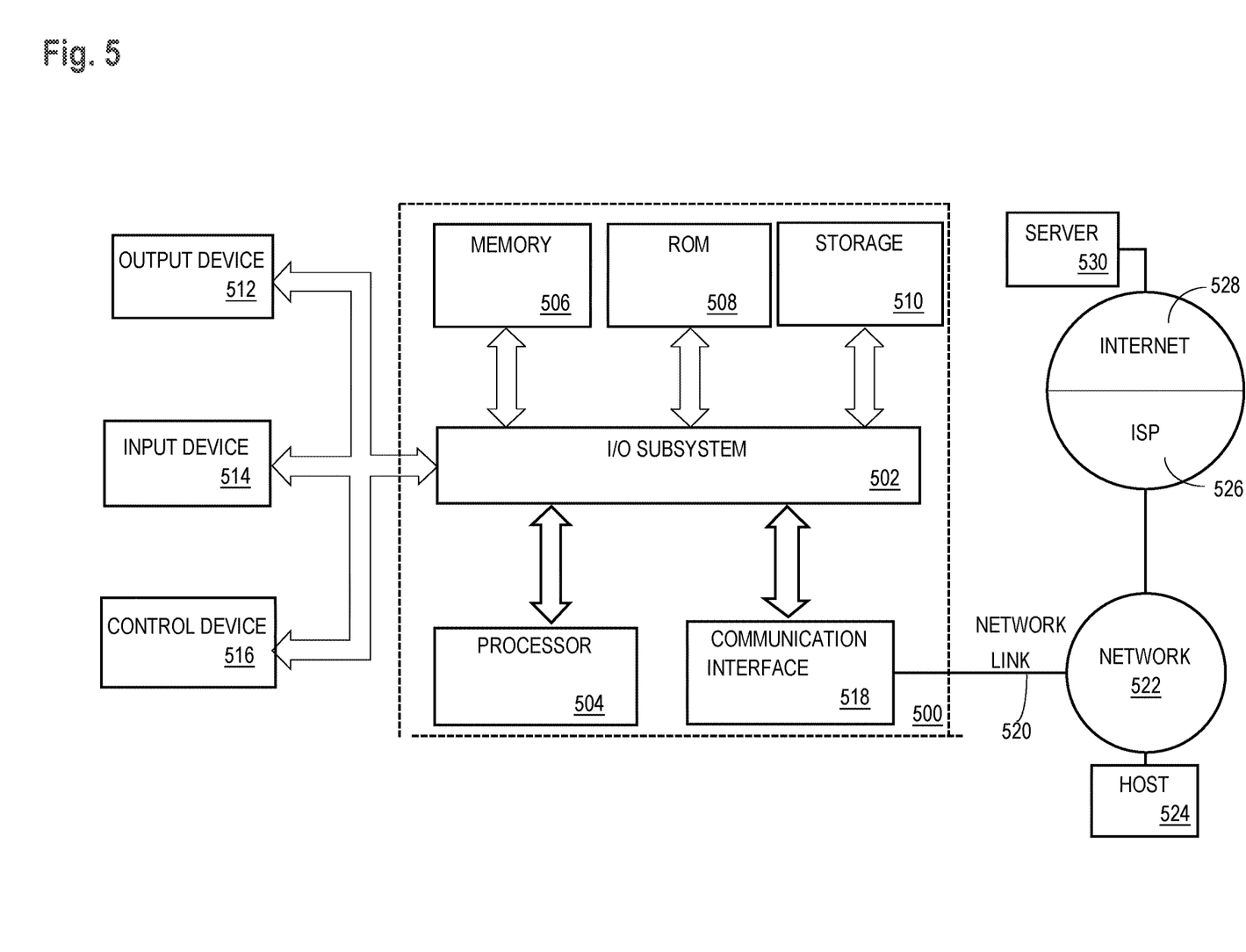
FIG. 5 shows a block diagram of a computer system with which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, or stored in storage device 510, or other non-volatile storage for later execution.

6. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving, by a server computing device, a plurality of digital action signals from a first group of users;
   identifying a first subset of the plurality of digital action signals corresponding to interactions between one or more users of the first group of users and one or more users of a second group of users through a collaboration platform;

normalizing the first subset of the plurality of digital actions signals based on at least one characteristic of the first group of users to generate a normalized first subset of the plurality of digital action signals;

assigning each digital action signal of the normalized first subset of the plurality of digital action signals to one of a set of interaction categories, each interaction category of the set of interaction categories corresponding to a type of interaction of the collaboration platform;

assigning a respective collaboration weight to each interaction category of the set of interaction categories to obtain a set of collaboration weights;

computing a collaboration index value using the set of collaboration weights and the normalized first subset of the plurality of digital action signals;

identifying a second subset of the plurality of digital action signals corresponding to actions performed by one or more users of the first group of users within an issue tracking system;

assigning each digital action signal of the second subset of the plurality of digital action signals to one of a set of action categories, each action category of the set of action categories corresponding to a type of action of the issue tracking system;

assigning a respective productivity weight to each action category of the set of action categories to obtain a set of productivity weights;

computing a productivity index value using the set of productivity weights and the second subset of the plurality of digital action signals;

identifying a recommendation that corresponds to at least one of the collaboration index value or the productivity index value; and transmitting the recommendation for display on at least one of the collaboration platform or the issue tracking system, the recommendation including a task to be taken by one or more users of the first group of users.

2. The computer-implemented method of claim 1, further comprising:

storing each of the normalized first subset of the plurality of digital action signals in a first entity table for the collaboration platform; and storing each of the second subset of the plurality of digital action signals in a second entity table for the issue tracking system.

3. The computer-implemented method of claim 2, wherein the productivity index value is generated based on a recency metric that indicates how recent the interactions or the actions were performed.

4. The computer-implemented method of claim 2, wherein the productivity index value is generated based on a frequency metric that indicates how often the interactions or the actions were performed.

5. The computer-implemented method of claim 2, wherein the collaboration index value is generated based on a network effect metric that indicates how interactive the first group of users is with the second group of users.

6. The computer-implemented method of claim 2, further comprising:

determining that the productivity index value is below a threshold; and including, within the recommendation, a suggestion for a user of the first group of users to join a particular group of users to increase the productivity index value.

7. The computer-implemented method of claim 2, further comprising:

generating a user interaction table based on the first entity table, the user interaction table specifying the interactions performed by the first group of users;

generating a user action table based on the second entity table, the user action table specifying the actions performed by the first group of users; and generating a social graph based on the user interaction table and the user action table, the social graph representing the actions and the interactions performed by the first group of users.

8. The computer-implemented method of claim 7, wherein:

digital metadata is generated based on the user interaction table, the user action table, and the social graph; and the collaboration index value and the productivity index value are generated based on the digital metadata associated with each user of the first group of users.

9. The computer-implemented method of claim 7, wherein:

the user interaction table includes a first digital record specifying pairs of users that were involved in the interactions represented in the first entity table and a first content item through which the pairs of users interacted; and the user action table includes a second digital record specifying individual users that were involved in the actions represented in the second entity table and a second content item through which the individual users acted.

10. The computer-implemented method of claim 2, further comprising:

determining that the collaboration index value is below a threshold; and including, within the recommendation, a suggestion for a user of the first group of users to join a particular group of users to increase the collaboration index value.

11. A computer system comprising:

one or more processors;

one or more memories storing instructions which, when executed by the one or more processors, cause the one or more processors to:

receive a plurality of digital action signals from a first group of users;

identify a first subset of the plurality of digital action signals corresponding to interactions between one or more users of the first group of users and one or more users of a second group of users through a collaboration platform;

normalize the first subset of the plurality of digital actions signals based on at least one characteristic of the first group of users to generate a normalized first subset of the plurality of digital action signals;

assign each digital action signal of the normalized first subset of the plurality of digital action signals to one of a set of interaction categories, each interaction category of the set of interaction categories corresponding to a type of interaction of the collaboration platform;

assign a respective collaboration weight to each interaction category of the set of interaction categories to obtain a set of collaboration weights;

compute a collaboration index value using the set of collaboration weights and the normalized first subset of the plurality of digital action signals;

identify a second subset of the plurality of digital action signals corresponding to actions performed by one or more users of the first group of users within an issue tracking system;

assign each digital action signal of the second subset of the plurality of digital action signals to one of a set of action categories, each action category of the set of action categories corresponding to a type of action of the issue tracking system;

assign a respective productivity weight to each action category of the set of action categories to obtain a set of productivity weights;

compute a productivity index value using the set of productivity weights and the second subset of the plurality of digital action signals;

identify a recommendation that corresponds with at least one of the collaboration index value or the productivity index value; and transmit the recommendation for display on at least one of the collaboration platform or the issue tracking system, the recommendation including a task to be taken by one or more users of the first group of users.

12. The computer system of claim 11, wherein the instructions further cause the one or more processors to:

store each of the normalized first subset of the plurality of digital action signals in a first entity table for the collaboration platform; and store each of the second subset of the plurality of digital action signals in a second entity table for the issue tracking system.

13. The computer system of claim 12, wherein the productivity index value is generated based on a recency metric that indicates how recent the interactions or the actions were performed.

14. The computer system of claim 12, wherein the productivity index value is generated based on a frequency metric that indicates how often the interactions or the actions were performed.

15. The computer system of claim 12, wherein the collaboration index value is generated based on a network effect metric that indicates how interactive the first group of users is with the second group of users.

16. The computer system of claim 12, wherein the instructions further cause the one or more processors to:

determine that the productivity index value is below a threshold; and include, within the recommendation, a suggestion for a user of the first group of users to join a particular group of users to increase the productivity index value.

17. The computer system of claim 12, wherein the instructions further cause the one or more processors to:

determine that the collaboration index value is below a threshold; and include, within the recommendation, a suggestion for a user of the first group of users to join a particular group of users to increase the collaboration index value.

18. The computer system of claim 12, wherein the instructions further cause the one or more processors to:

generate a user interaction table based on the first entity table, the user interaction table specifying the interactions performed by the first group of users;

generate a user action table based on the second entity table, the user action table specifying the actions performed by the first group of users; and generate a social graph based on the user interaction table and the user action table, the social graph representing the actions and the interactions performed by the first group of users.

19. The computer system of claim 18, wherein:

digital metadata is generated based on the user interaction table, the user action table, and the social graph; and the collaboration index value and the productivity index value are generated based on the digital metadata associated with each user of the first group of users.

20. The computer system of claim 18, wherein:

the user interaction table includes a first digital record specifying pairs of users that were involved in the interactions represented in the first entity table and a first content item through which the pairs of users interacted; and the user action table includes a second digital record specifying individual users that were involved in the actions represented in the second entity table and a second content item through which the individual users acted.

* * * * *